United States Patent
Desombre et al.

(10) Patent No.: US 11,879,398 B2
(45) Date of Patent: Jan. 23, 2024

(54) FLEXIBLE FRUSTOCONICAL INPUT SHAFT

(71) Applicant: SAFRAN AIRCRAFT ENGINES, Paris (FR)

(72) Inventors: Didier Gabriel Bertrand Desombre, Moissy-Cramayel (FR); Paul Feliot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/799,539

(22) PCT Filed: Feb. 11, 2021

(86) PCT No.: PCT/FR2021/050245
§ 371 (c)(1),
(2) Date: Aug. 12, 2022

(87) PCT Pub. No.: WO2021/160969
PCT Pub. Date: Aug. 19, 2021

(65) Prior Publication Data
US 2023/0057973 A1   Feb. 23, 2023

(30) Foreign Application Priority Data
Feb. 14, 2020 (FR) ........................ 2001500

(51) Int. Cl.
*F02C 7/36* (2006.01)
*F01D 5/02* (2006.01)
*F01D 5/10* (2006.01)
*F01D 21/08* (2006.01)
*F16D 3/72* (2006.01)

(52) U.S. Cl.
CPC ............. *F02C 7/36* (2013.01); *F01D 5/026* (2013.01); *F01D 5/027* (2013.01); *F01D 5/10* (2013.01); *F01D 21/08* (2013.01); *F16D 3/72* (2013.01); *F05D 2240/62* (2013.01); *F05D 2250/232* (2013.01); *F05D 2250/314* (2013.01); *F05D 2260/4031* (2013.01)

(58) Field of Classification Search
CPC .... F02C 7/36; F02C 7/32; F01D 5/026; F01D 5/027; F01D 5/02; F01D 5/10;
(Continued)

(56) References Cited

U.S. PATENT DOCUMENTS 5,433,674 A    7/1995 Sheridan et al.
10,087,849 B2 * 10/2018 Currier ................. F16H 57/082
(Continued)

FOREIGN PATENT DOCUMENTS

EP         3 153 680 A1    4/2017
WO    WO 2019/122740 A1    6/2019

OTHER PUBLICATIONS

French Search Report for French Application No. FR2001500, dated Jun. 4, 2020.
(Continued)

*Primary Examiner* — Sabbir Hasan
*Assistant Examiner* — Joshua R Beebe
(74) *Attorney, Agent, or Firm* — BIRCH, STEWART, KOLASCH & BIRCH, LLP (57) ABSTRACT

The present invention relates to a shaft for a propulsion system configured to rotate a reducing mechanism about a rotational axis, the shaft comprising: —a first end configured to engage with an input gear of the reducing mechanism, —a first bellows and a second bellows, the first bellows and the second bellows being rotationally symmetrical about the rotational axis, the first bellows extending between the first end and the second bellows, and —a frustoconical body mechanically connecting the first bellows and the second bellows.

13 Claims, 6 Drawing Sheets

(58) Field of Classification Search
CPC ... F01D 21/08; F16D 3/72; F16D 3/10; F16D 3/08; F16D 3/02; F16D 3/06; F05D 2240/62; F05D 2250/232; F05D 2250/314; F05D 2260/4031; F16H 57/0025; F16H 57/035; F16H 57/0018; F16H 2057/02091; F16H 2057/02095; F16H 2057/0221; F16H 2057/0227

See application file for complete search history.

(56) References Cited

U.S. PATENT DOCUMENTS

| | | | | |
|---|---|---|---|---|
| 10,724,445 | B2* | 7/2020 | Sheridan | F02K 3/06 |
| 2007/0225111 | A1* | 9/2007 | Duong | F02C 7/36 |
| | | | | 475/331 |
| 2010/0150702 | A1* | 6/2010 | Sheridan | F01D 25/18 |
| | | | | 464/182 |
| 2012/0077607 | A1* | 3/2012 | Goujet | F16D 3/72 |
| | | | | 464/79 |
| 2014/0248129 | A1 | 9/2014 | Merry et al. | |
| 2017/0096941 | A1* | 4/2017 | Antelo | F02C 7/36 |
| 2018/0100563 | A1* | 4/2018 | Grubba | F02C 7/36 |
| 2020/0056543 | A1* | 2/2020 | Walker | F02C 7/06 |

OTHER PUBLICATIONS

International Search Report and Written Opinion of the International Searching Authority for Application No. PCT/FR2021/050245, dated Apr. 28, 2021.

* cited by examiner

FLEXIBLE FRUSTOCONICAL INPUT SHAFT

TECHNICAL FIELD

The present application relates to the field of aeronautical propulsion systems, and more precisely dual-flow propulsion systems having a speed reduction mechanism for driving the fan.

BACKGROUND

From upstream to downstream in the direction of the flow of gases a dual-flow propulsion system generally comprises a fan, a primary annular flow space and a secondary annular flow space which is externally relative to the primary flow. The mass of air aspirated by the fan is therefore divided into a primary flow which circulates in the primary flow space, and a secondary flow which is concentric to the primary flow and circulates in the secondary flow space. The fan (or helix) can be ducted and lodged in a fan casing or as a variant unducted of USF type (Unducted Single Fan). The fan blades can be fixed or have a variable pitch angle, the shimming being adjusted by a pitch-change mechanism as a function of flight phases.

The primary flow space crosses a primary body comprising one or more compressor stages, for example a low-pressure compressor (or booster) and a high-pressure compressor, a combustion chamber, one or more turbine stages, for example a high-pressure turbine and a low-pressure turbine, and a gas discharge pipe. Typically, the high-pressure turbine drives the high-pressure compressor in rotation by means of a first shaft, called high-pressure shaft, while the low-pressure turbine drives the low-pressure compressor and the fan in rotation by means of a second shaft, called low-pressure shaft. The low-pressure shaft is generally housed on a particular section in the high-pressure shaft.

To improve the propulsive output of the propulsion system and lower its specific consumption as well as the noise emitted by the fan, propulsion systems having a high bypass ratio, that is, the ratio between the flow rate of the secondary flow and the flow rate of the primary flow have been proposed. High bypass ratio here means a bypass ratio greater than 10, for example of the order of 15 or 20 or even considerably higher, for example of the order of 40 or 80 in the case of a turbomachine the fan of which is unducted.

To achieve such bypass ratios, the fan is uncoupled from the low-pressure turbine, effectively optimising their respective rotation speed independently. In general, uncoupling is performed by means of a speed reduction mechanism such as an epicycloid or planetary speed reduction mechanism, placed between the upstream end of the low-pressure shaft and the fan. The fan is driven by the low-pressure shaft by means of the speed reduction mechanism and an additional shaft, called fan shaft, which is fixed between the speed reduction mechanism and the disc of the fan.

This uncoupling therefore lowers the rotation speed and the pressure ratio of the fan and raises the power extracted by the low-pressure turbine.

Such a speed reduction mechanism generally comprises:
- a central pinion, called sun gear, to which a drive shaft of the propulsion system, typically the low-pressure shaft, can be connected
- a ring gear, coaxial to the sun gear and
- planet gears mounted on a planet carrier, each planet gear being meshed on the one hand with the sun gear and on the other hand with the ring gear.

The output shaft (generally, the fan shaft) especially can be driven in rotation by one of the ring gear or the planet carrier, the other being fixed relative to the casing of the speed reduction mechanism.

However, a propulsion system comprising a speed reduction mechanism is likely to come up against a certain number of difficulties to be reconciled with the interfaces:
The adequate levels of stiffness/flexibility limit overloads inside the pieces of the speed reduction mechanism, overloads generated in part by external misalignments (issue of managing misalignments), especially between the drive shaft and the sun gear.
The good mechanical strength of the pieces of the speed reduction mechanism in relation to the specific stresses linked to misalignments, especially on the rotor pieces (stress of rotatory flexion type combined with the torsion linked to the movement of the torque).
The mechanical strength of links (such as grooves of shafts or teeth of the sun gear, planet gears and ring gear) and their contribution to the recovery of misalignments.
The optimisation of the axial bulk of the speed reduction mechanism (impact on the motor length).
The functional clearances between the different pieces of the speed reduction mechanism.
The optimal mounting and modularity conditions.
The capacity to carry out the manufacturing of pieces of flexibility, given their generally complex form.

To compensate for any possible misalignments between the drive shaft and the speed reduction mechanism, it has been proposed to add, between the drive shaft and the input pinion, a shaft called flexible shaft configured to respond to a specification of flexibility coherent with the overloads of the speed reduction mechanism and the situation of the motor assembly dynamic. To this end the shaft comprises two straight gussets separated by a tubular barrel, the tubular barrel and the gussets being monolithic, that is, integral. The gussets play the role of spring and each has flexibility in rotation of flexion type of the shaft relative to its theoretical axis of rotation, whereas the barrel is rigid (non-deformable in rotation and in flexion in conditions of use). The shaft further comprises an upstream end bearing a groove and configured to engage with teeth associated with the sun gear and a downstream end configured to be fixed onto the drive shaft, for example near a bearing of the propulsion system. Because the barrel is rigid, the shaft is capable of transmitting the torque applied by the drive shaft of the propulsion system (generally the low-pressure shaft, which is driven by the low-pressure turbine). This transmission of torque however generates mechanical loads in the shaft called "static" or "average". Also, the gussets are configured to compensate for the misalignments between the drive shaft (in the region of the downstream end of the shaft) and the sun gear of the speed reduction mechanism (in the region of its upstream end). But these misalignments generate on the shaft a rotating bending performance having a large number of cycles and alternate loads, called "dynamic" loads (since they vary as the shaft revolves).

The sizing of the shaft must therefore consider these dynamic and static loads by finding the best compromise from the viewpoint of the geometry of the shaft and of the distribution of inertia between the barrel and the gussets to optimise the mechanical strength and service life margin of the shaft. More precisely, the barrel must be sufficiently stiff to limit the static loads while the gussets must be sufficiently supple to limit the dynamic loads.

Figure 7:
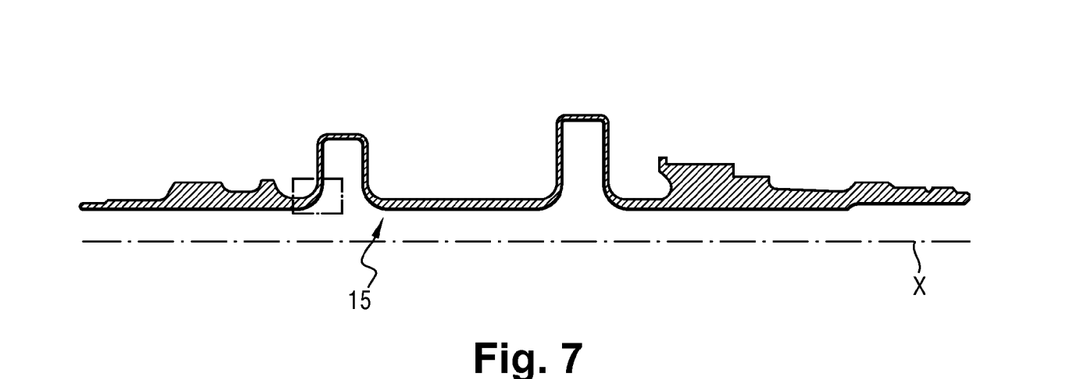
FIG. 7 is a partial sectional view of a conventional shaft, in which the concentration point of the static and dynamic loads has been enclosed.

However, it seems that the static maximum loads are concentrated in the same zone of the shaft as the maximum dynamic loads, specifically in the region of the junction between the upstream end of the shaft and the adjacent gusset (see the enclosed zone in the appended FIG. 7). The concentration of static and dynamic loads in the same place of the shaft substantially reduces the service life margins of the shaft.

SUMMARY

An aim of the invention is to propose a solution to the disadvantages described hereinabove, and especially to provide robustness to the mechanical strength of the shaft and still comply with specifications of flexibility.

For this purpose, according to a first aspect, a shaft is proposed for a propulsion system configured to drive a speed reduction mechanism in rotation about an axis of rotation, said shaft comprising:
- a first end, configured to engage with an input pinion of the speed reduction mechanism,
- a first gusset and a second gusset, the first gusset and the second gusset being symmetrical in revolution about the axis of rotation, the first gusset extending between the first end and the second gusset, and
- a frustoconical barrel mechanically connecting the first gusset and the second gusset.

The barrel of the shaft is particularly frustoconical when at rest, that is, out of any external stress.

Some preferred but non-limiting characteristics of the shaft according to the first aspect are the following, taken individually or in combination:
- a half-angle at the apex of the truncated cone defined by the frustoconical barrel is greater than or equal to 5° and less than or equal to 25°.
- a barrel has a first diameter near the first gusset and a second diameter near the second gusset, the second diameter being strictly less than the first diameter.
- a maximum diameter of the first gusset is between 80% and 120% of a maximum diameter of the second gusset.
- the first gusset is attached to the first end by a first fillet, a radius of curvature of the first fillet being greater than or equal to 10 mm and less than or equal to 20 mm.
- a portion of the first end is frustoconical.
- the second gusset is connected to the barrel in the region of a second fillet, a radius of curvature of the second fillet being greater than or equal to 10 mm and less than or equal to 15 mm.
- the barrel has a first diameter near the first gusset and a second diameter near the second gusset, the second diameter being strictly greater than the first diameter.
- the first end comprises grooves configured to engage with teeth of the input pinion.

According to a second aspect, the application discloses a drive assembly for a propulsion system, said assembly comprising a shaft according to the first aspect and a speed reduction mechanism comprising an input pinion, the first end of the shaft engaging with the input pinion of the speed reduction mechanism to drive it in rotation about the axis of rotation.

According to a third aspect, the application discloses a propulsion system comprising a drive assembly according to the second aspect and a turbine section, said turbine section being attached to the shaft so as to drive it in rotation about the axis of rotation.

According to a fourth aspect, the application discloses an aircraft comprising a propulsion system according to the third aspect.

DESCRIPTION OF THE FIGURES

Other characteristics, aims and advantages of the invention will emerge from the following description which is purely illustrative and non-limiting and which must be considered with respect to the appended drawings, in which.

In all figures similar elements have identical reference numerals.

DETAILED DESCRIPTION

In the present application the upstream and downstream are defined relative to the direction of normal flow of gas in the fan and through the propulsion system.

Figure 1:
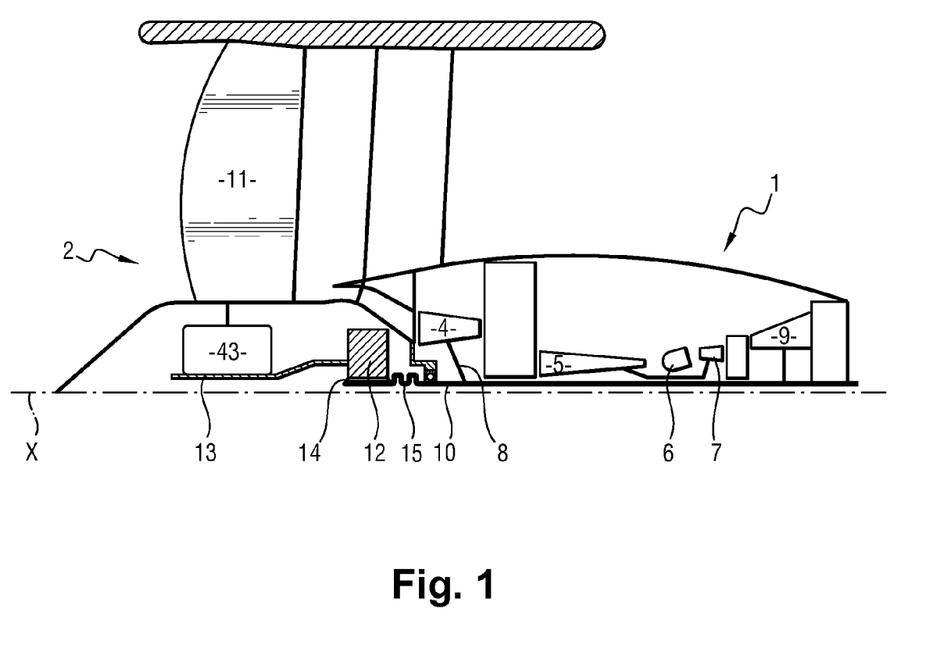
FIG. 1 schematically illustrates an example of an aeronautic propulsion system comprising a ducted fan in keeping with an embodiment of the invention.

The propulsion system 1 for an aircraft 100 conventionally comprises a fan 2 and a primary body. In the direction of flow of gas in the propulsion system 1, the primary body comprises an inlet channel extending immediately downstream of the fan 2, a low-pressure compressor 4 (or booster), a high-pressure compressor 5, a combustion chamber, a high-pressure turbine 7, a low-pressure turbine 9 and a gas discharge pipe. The high-pressure turbine 7 drives the high-pressure compressor 5 in rotation by means of a high-pressure shaft 8 while the low-pressure turbine 9 drives the low-pressure compressor 4 and the fan 2 in rotation by means of a low-pressure shaft 10.

The fan 2 comprises a fan disc 43 provided with fan blades 11 at its periphery which, when set in rotation, guide the air flow in the primary and secondary flow spaces of the propulsion system 1.

The invention applies to any type of aeronautic dual-flow propulsion system 1, whether the fan 2 is ducted or unducted, with fixed blades or variable-pitch blades.

The propulsion system 1 has a high bypass ratio. High bypass ratio here means a bypass ratio greater than or equal to 10, for example between 10 and 80 (including an order of magnitude for the case of a motor of which the fan is unducted). For this, the fan 2 is uncoupled from the low-pressure turbine 9 to independently optimise their respective rotation speed by means of a speed reduction mechanism 12 placed between the upstream end (relative to the direction of flow of gases in the propulsion system 1) of the low-pressure shaft 10 and the fan 2. The fan 2 is then driven by the low-pressure shaft 10 by means of the speed reduction mechanism 12 and a fan shaft 13 which is fixed between the speed reduction mechanism 12 and the disc of the fan 2. The fan shaft 13 is mobile in rotation about an axis of rotation X coaxial to the axis of rotation X of the low-pressure shaft 10.

To calculate the bypass ratio, the secondary flow rate and the primary flow rate are measured when the propulsion system 1 is stationary in the take-off regime in a standard atmosphere (as defined by the International Civil Aviation Organisation (ICAO) Manual, Doc 7488/3, 3rd edition) and in the maritime region.

The speed reduction mechanism 12 comprises, as described above:
- a sun gear 14, mounted mobile in rotation about an axis of rotation X, at the centre of the reducer,
- a ring gear, coaxial to the sun gear 14, and
- planet gears, mounted on a planet carrier, each planet gear being meshed on the one hand with the central pinion and on the other hand with the ring gear.

To provide robustness to the mechanical strength of the low pressure shaft for its connection with the speed reduction mechanism 12 while complying with flexibility specifications, the propulsion system 1 comprises a shaft 15, called flexible shaft, configured to drive the speed reduction mechanism 12 in rotation about the axis of rotation X, and comprising:
- a first end 16, or upstream end 16, configured to engage with the sun gear 14 of the speed reduction mechanism 12,
- a first gusset 17 and a second gusset 18, the first gusset 17 and the second gusset 18 being symmetrical in revolution about the axis of rotation X, the first gusset 17 extending between the first end 16 and the second gusset 18,
- a barrel 19 mechanically connecting the first gusset 17 and the second gusset 18, and
- a second end 20, or downstream end 20, extending downstream of the second gusset 18 opposite the upstream end 16 and configured to be fixed on a bearing of the propulsion system 1, typically a front bearing of the low-pressure shaft 10. A scope with such a bearing is referenced 20P in FIG. 2, such a bearing conventionally supporting the downstream end of the shaft 15 and the upstream of the low-pressure shaft.

Figure 4:
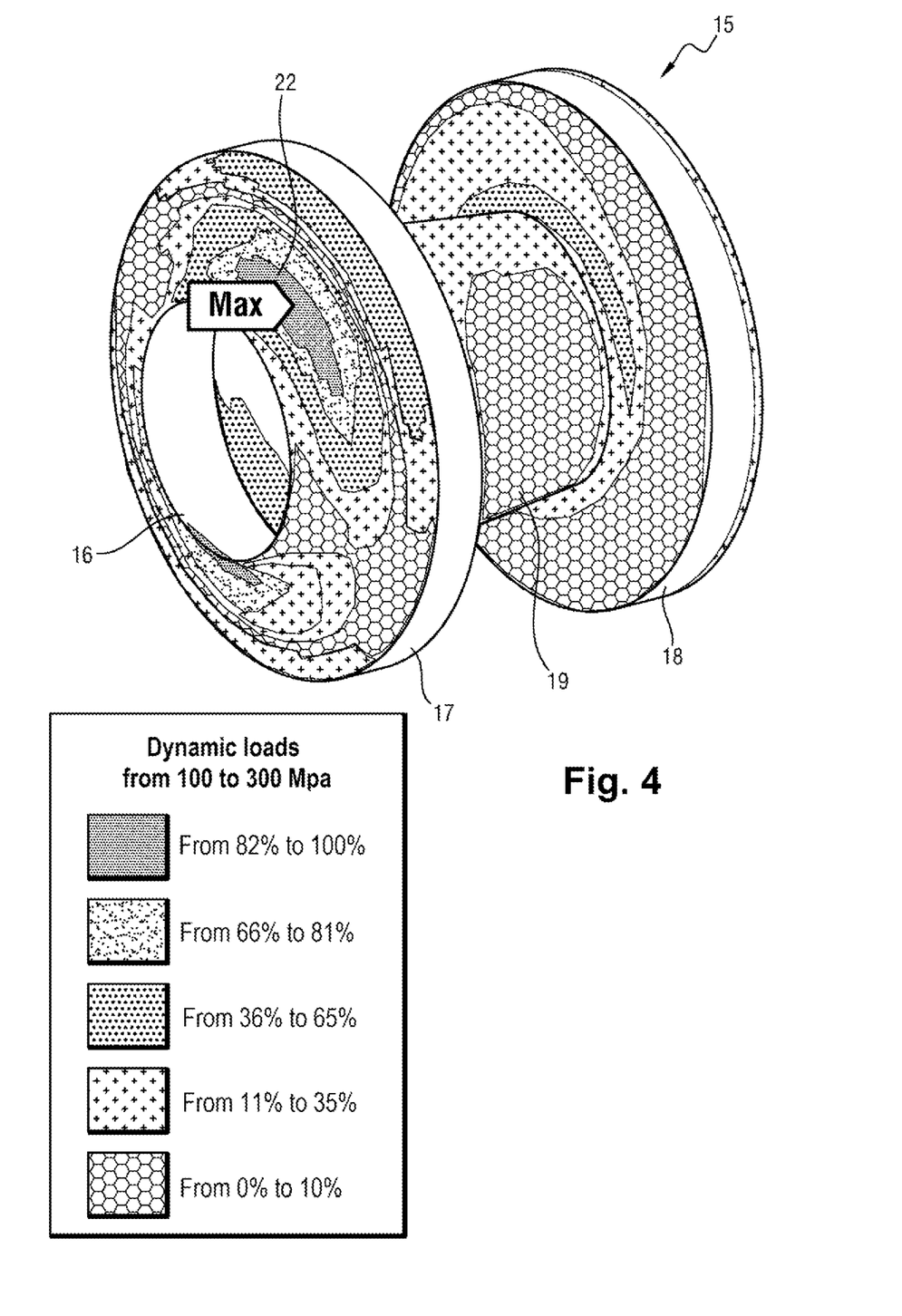
FIG. 4 is a perspective view of the shaft of FIG. 2, illustrating the dynamic load fields when the shaft is in an operating propulsion system.
Figure 5:
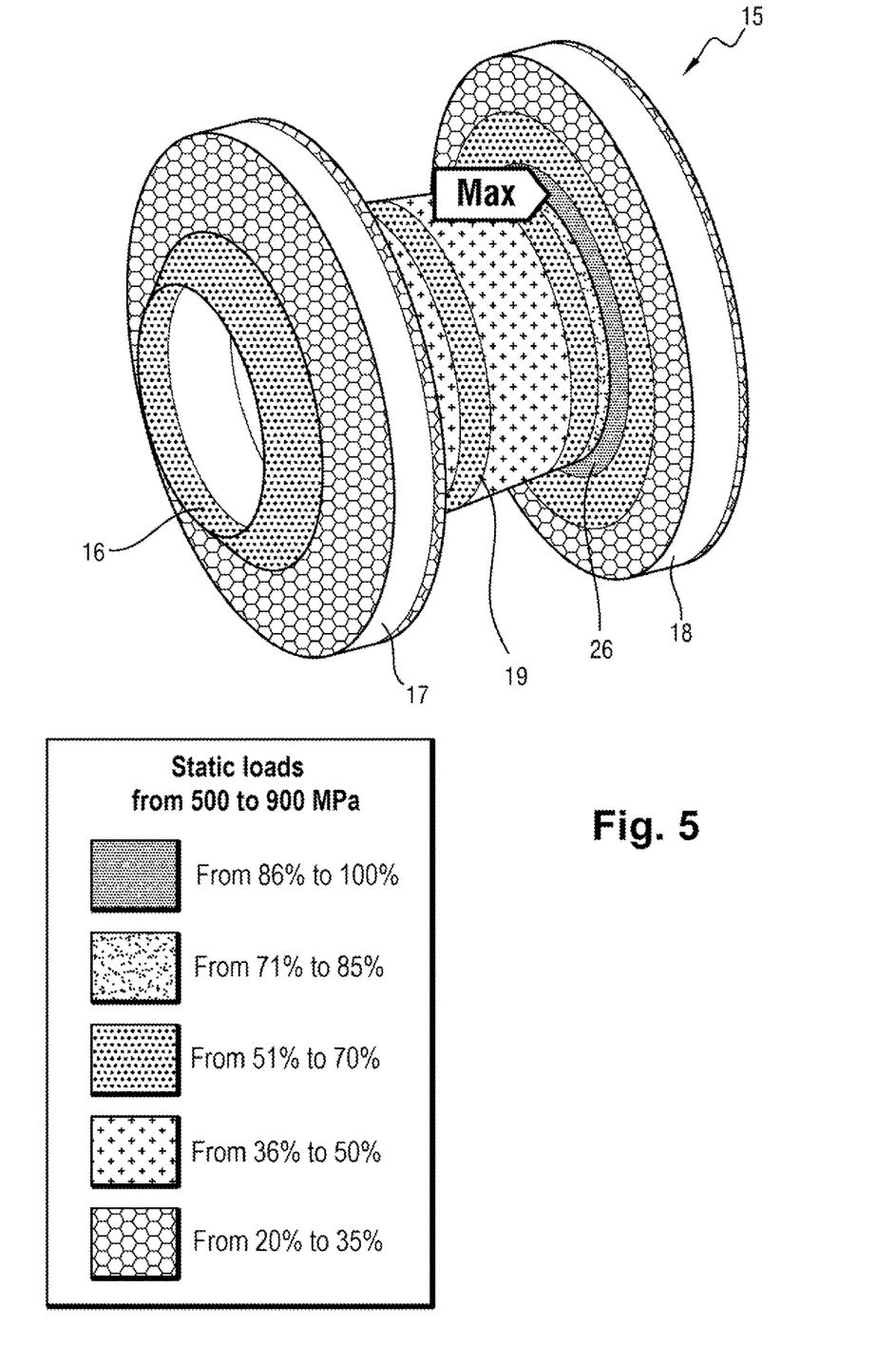
FIG. 5 is a perspective view of the shaft of FIG. 2, illustrating the static load fields when the shaft is in an operating propulsion system.
Figure 6:
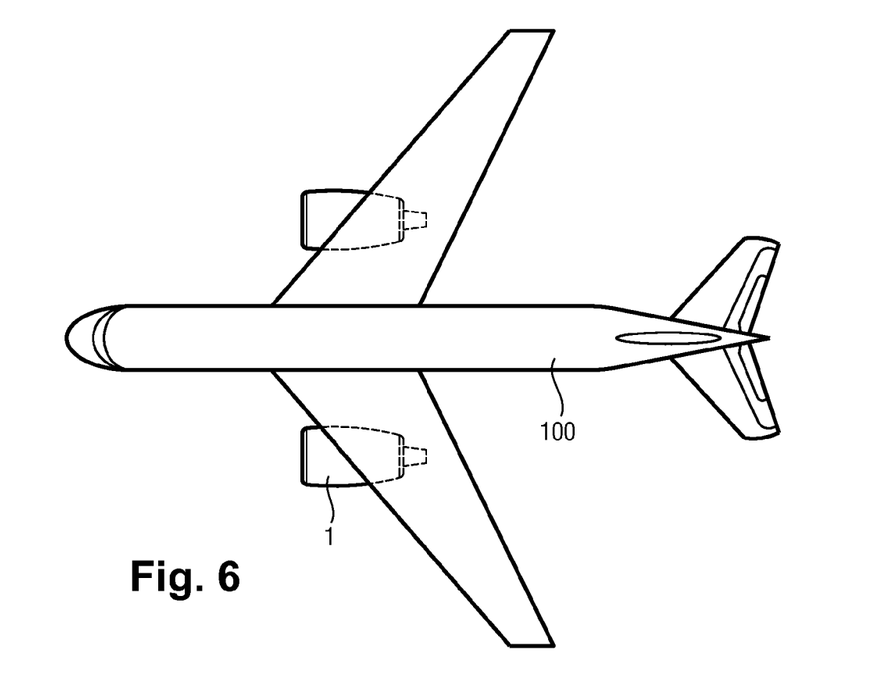
FIG. 6 is a top plan view of an example of an aircraft capable of comprising a propulsion system according to the invention.

The barrel 19 of the shaft 15 is frustoconical, such that the place of maximum static load (framed A) is decorrelated from the place of maximum dynamic load (framed B), as shown in FIGS. 4 and 5. The barrel 19 of the shaft 15 is therefore frustoconical when at rest, that is, out of any external stress. In this way, maximum static loads are located at the interface between the second gusset 18 and the barrel 19, whereas the maximum dynamic loads are located at the interface between the first gusset 17 and the upstream end 16 of the shaft 15. The service life margin of the shaft 15 is therefore substantially improved as compared to the shafts having conventional tubular barrel 19.

The angle of inclination and the orientation of the truncated cone forming the barrel 19 are dimensioned according to the absolute misalignment which may exist upstream and downstream of the shaft 15. Absolute misalignment is understood here to mean misalignment resulting solely from the upstream (respectively downstream) movement of the shaft 15, as opposed to relative misalignment of the shaft 15, which corresponds to the sum of the absolute misalignments seen by the shaft 15.

Figure 2:
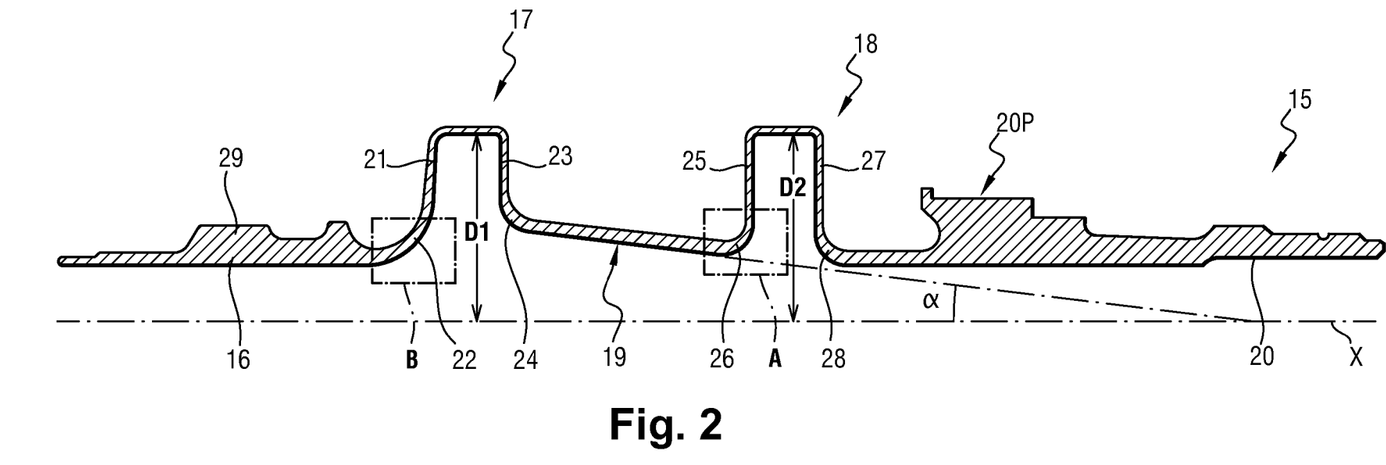
FIG. 2 is a partial sectional view of an embodiment of a shaft for a propulsion system in keeping with a first embodiment, in which the concentration points of the static and dynamic loads have been framed.

In particular, when, in a given propulsion system 1, absolute misalignments are greater upstream of the shaft 15 (that is, in the region of the speed reduction mechanism 12) than downstream (that is, in the region of the bearing on the upstream side of the low-pressure shaft), the frustoconical barrel 19 converges from upstream to downstream. In other terms, the diameter of the frustoconical barrel 19 is greater in the region of the first gusset 17 than in the region of the second gusset 18 (FIG. 2).

Figure 3:
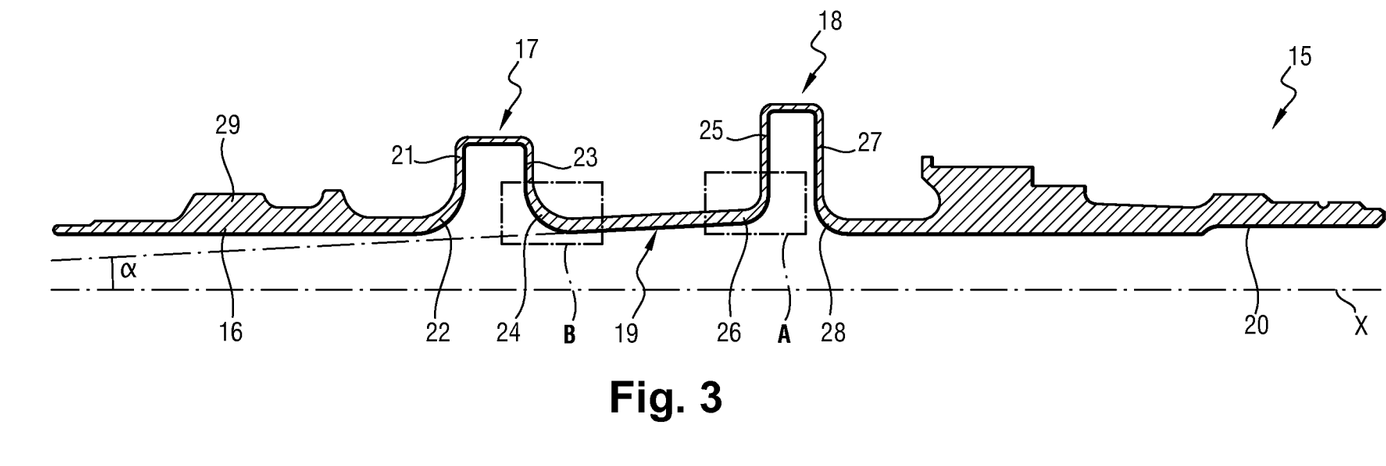
FIG. 3 is a partial sectional view of an embodiment of a shaft for a propulsion system in keeping with a second embodiment, in which the concentration points of the static and dynamic loads have been framed.

However, in a given propulsion system 1, when absolute misalignments are more significant downstream of the shaft 15 than upstream, the frustoconical barrel 19 diverges from upstream to downstream. In other terms, the diameter of the frustoconical barrel 19 is smaller in the region of the first gusset 17 than in the region of the second gusset 18 (FIG. 3).

Here, diameter means the diameter measured in a plane normal to the axis of rotation X.

Hereinbelow, the invention will be described more particularly in the case of a converging frustoconical shaft 15, that is, the largest diameter of which is positioned near the downstream flank of the first gusset 17. As has just been specified, this is however not limiting, as the frustoconical shaft 15 can be divergent, as illustrated in FIG. 3. The description therefore applies mutatis mutandis to such a divergent shaft 15 simply by inverting of the configuration described, unless otherwise expressed throughout the present description.

In an embodiment, the slope of the truncated cone forming the barrel 19 has a half-angle α at the apex between 5° and 25°. Half-angle α at the apex here means the angle α formed between the axis of rotation X and the external surface of the barrel 19.

Each gusset 17, 18 has an upstream flank and a downstream flank. The upstream flank 21 of the first gusset 17 is attached to the upstream end 16 of the shaft 15 by means of a first upstream fillet 22 and its downstream flank 23 is connected to the barrel 19 by means of a first downstream fillet 24. Similarly, the upstream flank 25 of the second gusset 18 is connected to the barrel 19 by means of a second upstream fillet 26 and its downstream flank 27 is attached to the downstream end 20 of the shaft 15 by means of a second downstream fillet 28.

In an embodiment, because the barrel 19 has a greater diameter in the region of the downstream flank 23 of the first gusset 17, the maximum diameter D1 of the first gusset 17 can be increased in comparison with conventional shafts so that the first gusset 17 remains sufficiently supple. In fact, the flexibility of a gusset depends on the first order of its maximum radial extent (that is, its height given the diameter at the apex of the gusset to be compared to the diameter of the shaft to the radially internal side of the downstream flank 21 of said first gusset 17). It follows that the radius of curvature of the first upstream 22 and downstream 24 fillets can likewise be augmented, reducing the static loads in these first fillets 22, 24.

Typically, the maximum diameter D1 of the first gusset 17 is between 80% and 120% of the maximum diameter D2 of the second gusset 18, for example between 90% and 100%.

Also, the radius of curvature of the first upstream fillet 22 can be greater than or equal to 10 mm and less than or equal to 20 mm. The radius of curvature of the first downstream fillet 24 can be greater than or equal to 5 mm and less than or equal to 15 mm.

It should be noted in particular that the greater the half-angle α of the truncated cone forming the barrel 19, the greater the maximum diameter D1 of the first gusset 17 (to remain iso-flexible and to respect the compromise between the mechanical strength of the shaft 15 and the flexibility specifications relative to the propulsion system, without modifying the length of the shaft 15) and the greater the radii of curvature of the first upstream 22 and downstream 24 fillets can be.

Figure 8:
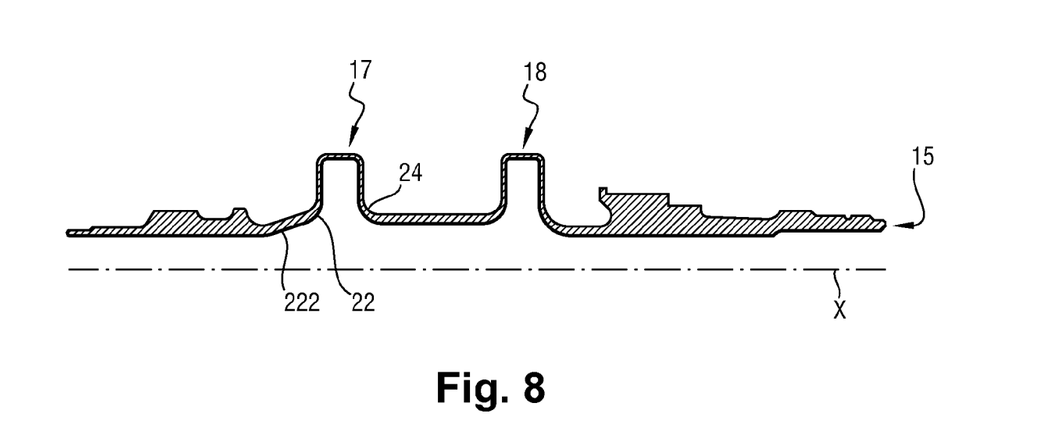
FIG. 8 is a partial sectional view of an embodiment of a shaft for a propulsion system in keeping with a third embodiment, in an example of a variant embodiment of the embodiment illustrated in FIG. 7.
Figure 9:
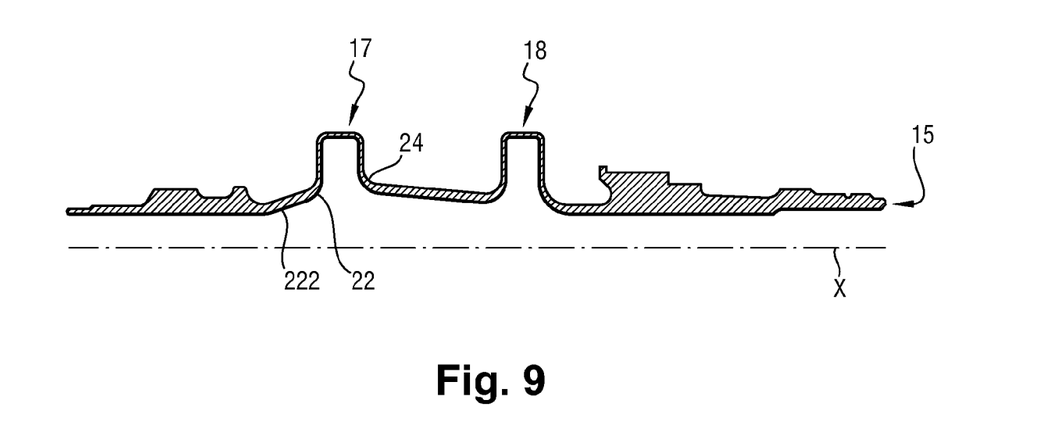
FIG. 9 is an example of a variant embodiment of the first embodiment illustrated in FIG. 2.
Figure 10:
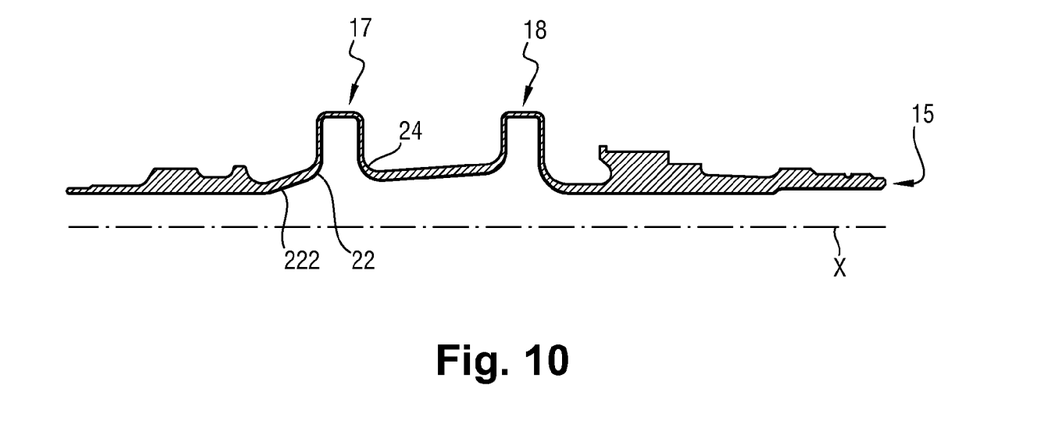
FIG. 10 is an example of a variant embodiment of the second embodiment illustrated in FIG. 3.

Optionally, so as to further reduce static loads in the region of the first upstream fillet, the upstream end 16 can comprise a frustoconical portion 222 (see especially appended FIGS. 8 to 10). Preferably, as the upstream end 16 bears the grooves 29 configured to engage the shaft 15 with the sun gear 14 of the speed reduction mechanism 12, the frustoconical portion 222 extends between the first upstream fillet 22 and the grooves 29 (the portion comprising the grooves 29 remaining tubular overall). The radius of curvature of the first upstream fillet 22 can then be increased even more as compared to conventional shafts.

In reference to FIG. 2, in the region of the second gusset 18, the consequence of the frustoconical shape of the shaft 15 is to reduce the angular extent of the radius of curvature of the second upstream fillet 26, in turn increasing static loads in this zone. In fact, this part of the barrel 19 has a smaller diameter. However, the applicant has noticed that since this second upstream fillet 26 concentrates only maximum static loads (dynamic loads being slight), its sizing was more flexible. The increase in static loads in the region of the second upstream fillet 26 therefore does not impact the increase in the service life margin resulting from the frustoconical shape of the barrel 19.

A shaft 15 having a frustoconical barrel 19 flaring from downstream to upstream, as shown in FIG. 2, therefore receives considerable static loads but minimal dynamic loads in the region of the second gusset 18 (framed A), to the side of the second upstream fillet 26, as well as minimal static loads and average dynamic loads in the region of the first gusset 17 (framed B), to the side of the first upstream fillet 22, significantly boosting the service life margin.

In an embodiment, the shaft 15 is made of steel, for example stainless steel, or a superalloy based on nickel and comprising chrome, iron, niobium and molybdenum, for example about 19 or 20 percent nickel and also 19 or 20 percent chrome and likewise 19 or 20 percent iron and for example also a few percent niobium and molybdenum. In the case of a shaft 15 made from such an alloy with the proportions hereinbelow NiCr19Fe19Nb5Mo3, the thickness of the barrel 19 can for example be between 4.0 mm and 8.0 mm and the thickness of the gussets can be of the order of 2.5 and 5.0 mm, close to 10%. The maximum diameter D1 of the first gusset 17 can be greater than 170 mm, for example less than 250 mm, remaining for example greater than the maximum diameter D2 of the second gusset 18. The maximum diameter D2 of the second gusset 18 can be greater than or equal to 150 mm and for example less than 240 mm, for example remaining less than the maximum diameter D1 of the first gusset. The radius of curvature of the second upstream fillet 26 can be between 5 mm and 10 mm.

The radius of curvature of the second downstream fillet 28 can be likewise between 5 mm and 10 mm. In general, the gusset which is adjacent to the barrel at its end having its largest diameter can have a maximum external diameter greater than the gusset which is adjacent to the barrel at its end having its smallest diameter.

It is likewise evident that the frustoconical shape of the shaft 15 makes its manufacturing conditions easier. In fact, the gussets 17, 18 are generally made by removing material using a tool from the inside of the barrel 19, which constitutes a delicate operation. The frustoconical shape of the barrel 19 makes for easier access to the internal zone of the shaft 15 and clears up space for the machining tools.

As a variant, such as shown in FIG. 3, a shaft 15 having a frustoconical barrel 19 flared from upstream to downstream receives substantial static loads but light dynamic loads in the region of the second gusset 18 (framed A), to the side of the second upstream fillet 26, as well as light static loads and average dynamic loads in the region of the first gusset 17 (framed B), to the side of the first downstream fillet 24, which significantly increases the service life margin.

The invention has been illustrated in relation to a dual-flow ducted motor (cf. FIG. 1) but it also applies to corresponding shafts within the scope of a motor of open secondary flow type such as a USF (for Unducted Single Fan) of which the module comprising the fan rotor blading and its downstream rectifier blading are not ducted.

The invention claimed is:

1. A shaft for a propulsion system comprising:
a first end, configured to engage an input pinion of a speed reduction mechanism;
a first gusset and a second gusset, the first gusset and the second gusset being symmetrical in revolution about an axis of rotation of the input pinion, the first gusset extending between the first end and the second gusset; and
a frustoconical barrel, a first downstream fillet being immediately adjacent the first gusset and frustoconical barrel and a second upstream fillet being immediately adjacent the second gusset and frustoconical barrel.

2. The shaft according to claim 1, wherein a half-angle at an apex of a truncated cone defined by the frustoconical barrel is greater than or equal to 5° and less than or equal to 25°.

3. The shaft according to claim 1, wherein the frustoconical barrel has a first diameter near the first gusset and a second diameter near the second gusset, the second diameter being strictly less than the first diameter.

4. The shaft according to claim 1, wherein a maximum diameter of the first gusset is between 80% and 120% of a maximum diameter of the second gusset.

5. The shaft according to claim 1, wherein the first gusset is attached to the first end by a first upstream fillet, a radius of curvature of the first fillet being greater than or equal to 10 mm and less than or equal to 20 mm.

6. The shaft according to claim 1, wherein a portion of the first end is frustoconical.

7. The shaft according to claim 1, wherein a radius of curvature of the second upstream fillet is greater than or equal to 10 mm and less than or equal to 15 mm.

8. The shaft according to claim 1, wherein the frustoconical barrel has a first diameter near the first gusset and a second diameter near the second gusset, the second diameter being strictly greater than the first diameter.

9. The shaft according to claim 1, wherein the first end comprises grooves configured to engage teeth of the input pinion.

10. A drive assembly for a propulsion system comprising a shaft according to claim 1 and a speed reduction mechanism, wherein the speed reduction mechanism comprises an input pinion, the first end of the shaft engaging the input pinion of the speed reduction mechanism to drive the input pinion in rotation about the axis of rotation.

11. A propulsion system comprising a drive assembly according to claim 10 and a turbine section attached to the shaft so as to drive the shaft in rotation about the axis of rotation.

12. An aircraft including at least one propulsion system according to claim 11.

13. A shaft for a propulsion system comprising:
- a first end, configured to engage an input pinion of a speed reduction mechanism;
- a first gusset and a second gusset, the first gusset and the second gusset being symmetrical in revolution about an axis of rotation of the input pinion, the first gusset extending between the first end and the second gusset; and
- a frustoconical barrel, a first downstream fillet being immediately adjacent the first gusset and frustoconical barrel and a second upstream fillet being immediately adjacent the second gusset and frustoconical barrel, such that a lowermost inner diameter of the first downstream fillet between the first gusset and the frustoconical barrel is different from a lowermost inner diameter of the second upstream fillet between the second gusset and the frustoconical barrel.

\* \* \* \* \*